Dec. 5, 1961 B. D. HALPERN ET AL 3,011,954
SEPARATION OF METHANOL AND METHYL ACETATE
Filed Oct. 13, 1958 2 Sheets-Sheet 1
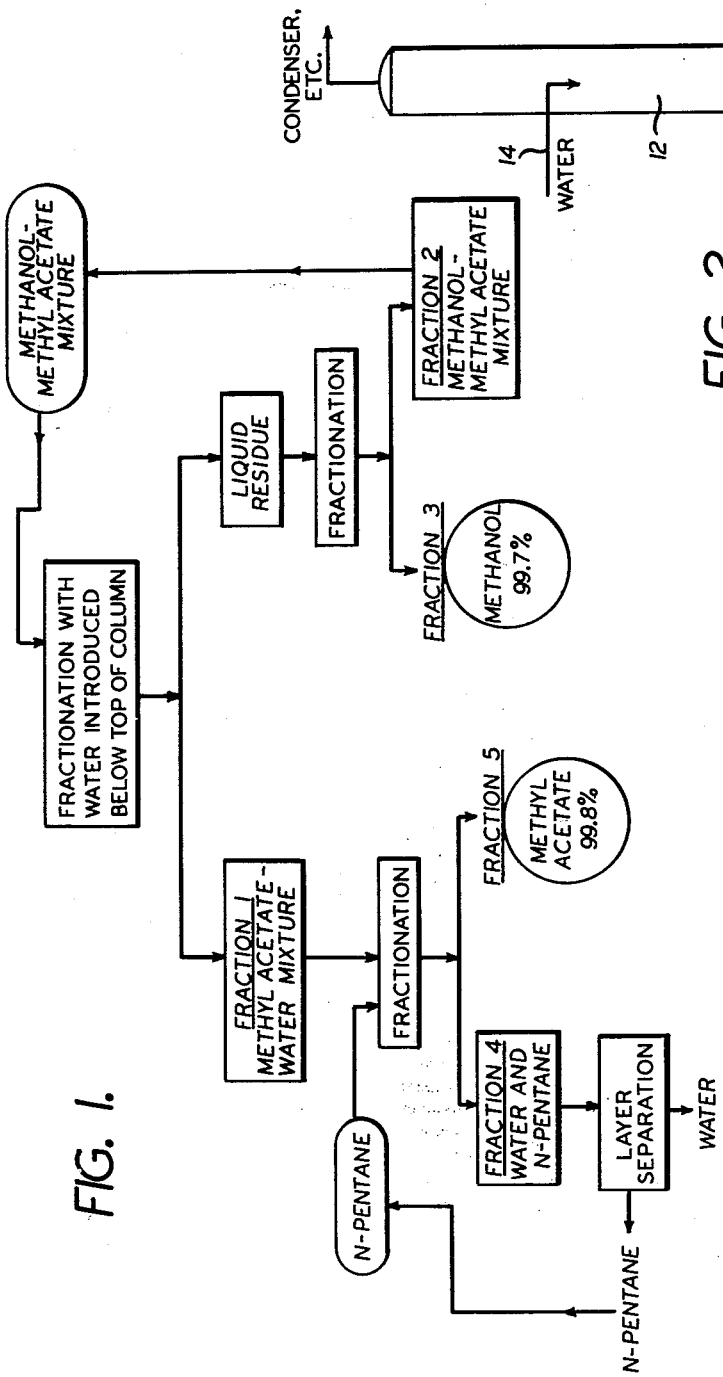
INVENTORS
BENJAMIN D. HALPERN
BRUNO O. KRUEGER
BY
ROBERT CALVERT
ATTORNEY

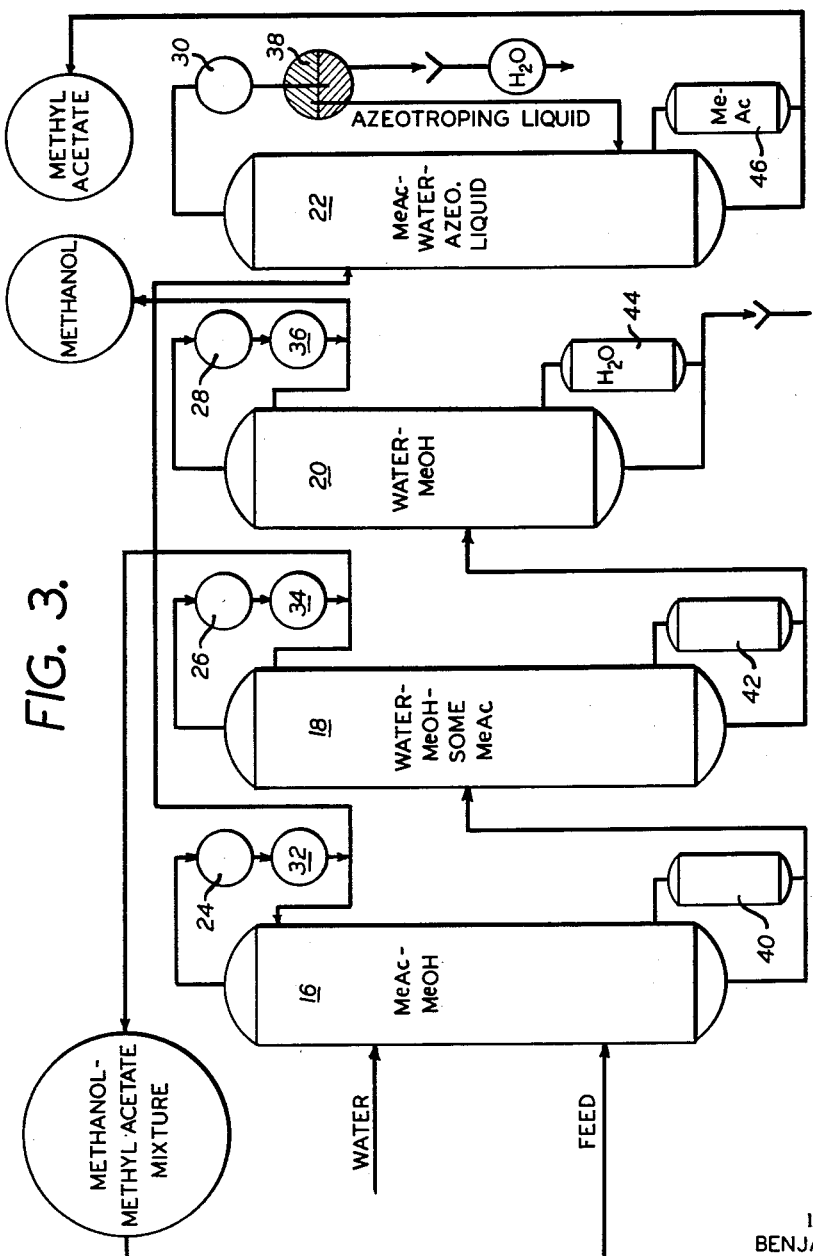

United States Patent Office 3,011,954
Patented Dec. 5, 1961

3,011,954
SEPARATION OF METHANOL AND METHYL ACETATE
Benjamin D. Halpern, Jenkintown, Pa., and Bruno Otto Krueger, Seattle, Wash., assignors to The Borden Company, New York, N.Y., a corporation of New York
Filed Oct. 13, 1958, Ser. No. 766,758
2 Claims. (Cl. 202—42)

This invention relates to the separation of esters from alcohols.

The invention is particularly useful in the separation of methyl acetate and methanol as they occur in the by-product liquid mixture from the manufacture of polyvinyl alcohol from polyvinyl acetate. The invention will be first illustrated, therefore, by description in connection with the separation of methyl acetate and methanol from such mixture.

In this alcoholysis of polyvinyl acetate to polyvinyl alcohol by methanol, there is recovered a liquid mixture which runs about half of each of methanol and methyl acetate. Because the two materials distil as an azeotrope containing about 19% of the methanol and 81% of the acetate, of boiling point 54.2° C., simple distillation methods of separating the acetate from the alcohol have not been satisfactory. As a result, there have been proposed various extracting processes, using, for instance, water and a liquid that is a good solvent for the ester and a poor solvent for the methanol and water, so that the water and alcohol enter one layer largely and the ester and the said solvent the other.

Our invention comprises the process of fractionating mixed methyl acetate and methanol until the content of methanol falls to a level below about 30%, introducing water continuously into the fractionating vapor, and proceeding with the fractionation. The fractionation is continued until methyl acetate and water, in substantially azeotropic proportions, are obtained in a fraction wherein the methanol content is practically zero. In this manner there is produced a methyl acetate fraction that, in a representative run, is 96.9% ester and 3.1% water. By fractionation of the residual material in the still, we then obtain a fraction of methanol content 99.5% of above.

It is noted that joint distillation of two azeotropes should be expected, because of closeness of boiling points. These are as follows:

|  | B.P., ° C. |
|---|---|
| Methanol-methyl acetate | 54.2 |
| Water-methyl acetate | 56.4 |

It is very surprising that the present invention separates substantially completely these two azeotropes of such close boiling points and also that the azeotrope first distilled from the mixture is the second one, of the slightly higher boiling point, as shown particularly in Example 1.

In the attached drawings—

FIG. 1 is a flow sheet showing the sequence of steps separating methyl acetate from methanol and recovering these materials in condition for reuse from the several fractions first obtained.

FIG. 2 is a diagrammatic side view of a batch still with fractionating column for the initial fractionation of the methyl acetate and methanol mixture with the introduction of water.

FIG. 3 is a similar view of equipment for effecting the separations and recoveries of components continuously.

All equipment used is conventional unless stated specifically to the contrary, as are all parts not illustrated in detail.

The still for effecting the initial fractionation, as shown in FIG. 2, includes a vessel or boiler 10 into which a batch of the methyl acetate and methanol mixture to be separated is charged and then heated. The fractionating column 12 contains a usual type of tower packing rings or saddles, bubble cap trays, or the like.

Inlet 14 for water is at a level substantially below the top of the column, as, for instance, at a distance about 25%–33% of the total column height below the top thereof.

At the top of the column, usual connections (not shown) deliver the fractionated vapors to conventional equipment including condenser, reflux return line, receiving tanks, and the like with suitable valves and accessories for switching receivers for collection of separate fractions in individual tanks and delivering those fractions for further processing.

The continuous equipment of FIG. 3 includes the fractionating towers 16, 18, 20, and 22; condensers 24, 26, 28, and 30; receivers 32, 34, 36, and 38 with equipment for returning a part of the condensates received from the condensers, in each case, to the top of the preceding tower and in part to a subsequent tower; and the reboilers 40, 42, 44, and 46 for receiving the residual liquid from positions near the bottom of the several towers.

As to materials used, the methyl acetate and methanol composition to be separated is one containing about 30–81 parts of methyl acetate for 100 parts total weight of methyl acetate and methanol. An example of a particularly suitable and important material is the methyl acetate and methanol mixture recovered from the polyvinyl acetate alcoholysis, such mixture in a representative run being 47.7% acetate and 52.3% methanol by weight (about 51.6% and 48.4%, respectively, by volume).

The water as introduced may be cold or hot, it being hot as at about 60°–100° C., when reused directly from the reboiler 44.

The liquid used for azeotroping out the water from the fraction 1, consisting of the methyl acetate and water mixture with a minor proportion of methanol, is a liquid that (1) gives with water an azeotrope of boiling point below that of the ester and water azeotrope, suitably also with methanol an azeotrope boiling below the methyl acetate and water azeotrope, i.e., less than about 56° C.; (2) separates as a layer from aqueous methanol; and (3) has a specific gravity so different from that of water as to facilitate the final separation of this liquid from the water subsequent to the azeotroping described. Examples of liquids that illustrate the class that may be used are any hydrocarbon liquid of boiling point at normal pressure below 60° C., as, for instance, normal pentane, hexane, and cyclopentane. Other liquids that may be used are methylene chloride and mono-bromomethane. In the case of the hydrocarbon liquids, they being lighter than water are separated as an upper layer. The halogenated hydrocarbons, being heavier, are separated as the lower layer.

As to proportions, the water is used in the proportion of at least approximately 100 parts and for best results 300–600 parts for 100 of methanol in the vapors at the level at which the water is introduced into the column. This proportion of water decreases the vapor pressure of the already low concentration of methanol, as at level 14. This effect upsets the azeotropic distillation and causes the further fractionation to give a distillate (fraction 1) practically free of methanol.

The proportion of reflux to accepted distillate is any usual ratio for good fractionation, as, for instance, about 1–10 parts of reflux to 1 of the distillate accepted.

In the azeotroping out of water from the fraction 1, there is used only a small amount of the azeotroping liquid as it is returned continuously to the column 22 from a decanter 38 placed below the condenser 30. Thus, we use to advantage about 10–25 parts of pentane or the like for 100 parts of the water and methyl acetate fraction 1 being processed in column 22.

As to conditions, the fractionations are made ordinarily at atmospheric pressure although the pressure may be made sub- or superatmospheric if desired. If the pressure is not 760 mm., then the temperatures herein referred to are changed to correspond to the boiling points of the various materials at the pressures used.

The position of introduction of water, as at 14 in FIG. 2, is at a level in the column at which the concentration of methyl acetate has been built up, by the fractionation below that position, to at least 70 parts of methyl acetate to 30 of methanol and below the top of the column by such distance that the fractionation above the level of water introduction will give approximately the azeotropic proportion of methyl acetate to water in vapors passing from the top of the column, as at the quarter to third spacing between top and bottom of the column previously stated. The water is introduced continuously, as in about an unchanging ratio to the amount of distillate obtained from column 12, so that the proportion of water to methanol at the level 14 of the column remains substantially constant after the distillation is in steady operation.

In general the batch method includes conducting the initial fractionation until distillation of the methyl acetate and water azeotrope at the temperature of boiling of the said azeotrope, namely, about 56.2°–56.4° C., becomes very slow. This will be the condition ordinarily when at least 70%–90% of the total methyl acetate charged has been distilled from the top of the column. When this condition has been realized, there is ordinarily a slight drop in the vapor temperature, previously steady, at the top of column 12; the flooding with water is no longer effective in maintaining the high ratio of acetate to methanol and the boiling point approaches the 54° B.P. of the methanol and methyl acetate azeotrope.

At this stage the introduction of water at 14 is discontinued. Then there is a switch to a second receiver, for fraction 2. Fractionation without the further addition of water is continued until the temperature at the top of the column becomes approximately the boiling point of methanol, as, for instance, 64.7° C., as compared to the theoretical boiling point of 64.65°. The fraction 2 so collected up to this point is a mixture of methanol and methyl acetate.

Then the fractionation is continued and the distillate collected in a third container as fraction 3, until practically no more methanol distils over and the vapor temperature at the top of column 12 rises slightly above the boiling point of methanol, as to about 65° C.

The residue is reused as water.

The fractionation of the original fraction 1, with added n-pentane or the like, is effected until substantially no more water collects in the decanter below the condenser. The pentane from one such fractionation is reused in a later fractionation. The water layer which is separated in the decanter may be reused as a source of the water for a subsequent initial fractionation in order to recover the small proportion of methanol that may accidentally be distilled from fraction 1 by the pentane.

The invention will be further illustrated by description in connection with the following specific examples.

All proportions here and elsewhere herein are stated as parts by weight unless specifically stated to the contrary.

EXAMPLE 1.—BATCH PROCESS

The fractionating column used had an efficiency equivalent to approximately 28 theoretical plates. The water inlet at 14 was at a level about 30% down from the top of the column towards the bottom. The apparatus was provided with electrically timed automatic reflux regulator, thermometer for reading vapor temperatures, condenser, receivers, and the like.

The mixture charged for the separation contained 48.4 parts of methyl acetate for 51.2 of methanol. This was charged to the still represented in FIG. 2 by 10 and brought to boiling. As soon as distillation started, water was introduced at the rate indicated, and the reflux ratio was set so that about 75% of the total distillate was returned as reflux and 25% accepted as the fraction 1 of the flow sheet. Distillation was continued until the vapor temperature at the top of the column showed a slight drop from the 56.4° C., where it had been holding, to 56.2°, this drop showing a decreased effectiveness of the water introduced or slowing of the rate of coming over of the vapors for the steady heating condition which existed in the pot 10.

The flow of water was then stopped and the portion of the distillate to be accepted switched to a second receiver, for the fraction 2.

Distillation was now continued without any additional water feed until the vapor temperature at the top of the column reached approximately the boiling point of pure methanol, that is, 64.7° C. Up to this point there had been collected the fraction 2, a mixture of methanol and methyl acetate.

The distillate was then switched to a third receiver and the fractionation continued until the vapor temperature at the top of the column rose to a point slightly above

*Distillation data*

[Kettle charge: 1500 ml. "Methac 60" (48.4% by vol. methyl acetate; 51.6% methanol)]

| Column Head Temp., °C. | Reflux Ratio | Cumulative Water Feed, ml. | Cumulative Distillate Take off, ml. | Fraction No. (See FIG. 1) | Total Accepted Distillate, ml. |
|---|---|---|---|---|---|
| 25.0 | | 30 | | | |
| 56.2 | 1:1 | 105 | 100 | | |
| 56.4 | 1:1 | 177 | 200 | | |
| 56.4 | 1:1 | 280 | 300 | Fraction 1: Methyl Acetate-water Azeotrope, 96.9% by vol. MeAc. | 620 |
| 56.4 | 1:1 | 300 | 330 | | |
| 56.4 | 1:1 | 357 | 400 | | |
| 56.4 | 1:1 | 438 | 500 | | |
| 56.2 | 1:1 | 510 | 620 | | |
| 55.7 | 1:1 | Stopped | 15 | | |
| 54.0 | 1:1 | | 35 | | |
| 56.0 | 1:1 | | 98 | Fraction 2: Methyl acetate Methanol, 58.1% by vol. MeAc. | 205 |
| 53.5 | 10:1 | | 118 | | |
| 64.7 | 10:1 | | 205 | | |
| 64.7 | 1:1 | | 50 | Fraction 3: Methanol, 99.7% by vol. | 680 |
| 65.0 | 1:1 | | 680 | | |
| | | | | Total Recovery | 1,505 |
| | | | | Kettle residue (water) | 480 |
| | | | | Column holdup | 25 | the boiling point of methanol, actually, to 65.0° C. Fraction 3 so obtained was practically pure methanol.

The residue consisting mostly of water with trace amounts of methanol was reserved for recharging to the still through inlet 14.

The distillation data and material balance from a run made in this manner with a glass flask as the vessel 10 and a glass fractionating column 4 feet long by 1 inch diameter are shown, proportions here being by volume.

*Materials balance by volume*

[Column-holdup not considered]

|  | Methyl Acetate | Methanol | Water | Total |
| --- | --- | --- | --- | --- |
| Charge | 484 | 516 | | 1,000 |
| Fract. 1 | 401.2 | | 12.8 | 414 |
| Fract. 2 | 79.6 | 57.4 | | 137 |
| Fract. 3 | | 452.0 | 1.0 | 453 |
| Total Recovered | 480.8 | 509.4 | 13.8 | [1] 1,004 |

[1] Exceeds charge due to the unmeasured water introduced.

EXAMPLE 2.—DRYING THE ESTER FRACTION

This example illustrates in greater detail the processing of fraction 1, to dehydrate the methyl acetate and give a dried material of high ester content suitable for commercial use as high test methyl acetate.

The pot 10 (here a flash) was charged with 1000 ml. of fraction 1 from Example 1 above and 200 ml. of n-pentane and the charge was brought to boil. Water was removed from the methyl acetate and carried up the column as a lower-boiling azeotrope with the n-pentane. The condensate flowed to the decanter, where the water and pentane separated. The water was then removed from the system and the pentane was fed back automatically to the column. Recirculation of a relatively small amount of pentane in this manner served to dehydrate the methyl acetate completely. Distillation was continued until no more water appeared in the decanter. Operating conditions during the distillation were as follows:

Head temperature _____ 32–33° C. (760 mm.).
Kettle temperature _____ 32–57° (liquid temp.).
Total water separated _____ 14.1 ml.
Cooling water temp _____ 5–8° C. (chilled water circulated).

The n-pentane was then recovered from the dehydrated methyl acetate by fractional distillation. A reflux ratio of 1:1 was used until the overhead temperature reached 40° C., when it was increased to 10:1, which was held until the boiling point of methyl acetate was approached. Methyl acetate was then distilled overhead in a straight run-down distillation (100% forward flow) to remove mechanical impurities.

*Materials balance*

Charge: Ml.
    Methyl acetate _____ 969
    Water _____ 31
    n-Pentane _____ 200

Total _____ 1200
Recovery:
    Methyl acetate 99.8% _____ 920
    Water _____ 28
    n-Pentane-MeAc _____ 250

Total _____ 1198

An important feature of this distillation is the removal by the pentane of accidental traces of methanol from the methyl acetate, simultaneously with the dehydration. Such small amounts of methanol go with the water.

The recovered n-pentane contains a small amount of methyl acetate which is charged with the n-pentane (of boiling range 32.2–37.2° C.) to the next still batch, in pot 10.

EXAMPLE 3.—CONTINUOUS PROCESS

The combined procedure of Examples 1 and 2 are made continuous by the provision of additional towers and other fractionation and receiving equipment of conventional kind, so that the several operations described are conducted simultaneously and continuously, with the return of liquids recovered for reuse as illustrated in the flow sheet constituting FIG. 1 and also in FIG. 3.

This continuous separation of the mixture is described and explained in connection with FIG. 3. The distillations and conditions are the same as in the batch operation except as stated and except that each fractionation is performed by a separate tower.

Tower 16 separates most of the methyl acetate into a methanol-free form from its mixture with methanol by the water treatment and fractionation. The acetate fraction so produced contains 3%–4% water as azeotrope. It is fed to tower No. 22 for dehydration as described. A methyl acetate lean mixture of methanol, water and methyl acetate is continuously withdrawn from the bottom of the tower and fed to tower No. 18 for further separation.

The said lean mixture from tower 16 is fractionated in tower No. 18, to remove remaining methyl acetate, together with some methanol and traces of water, as overhead distillate. The distillate is recirculated to the feed of tower No. 16 to be separated with the original starting material. A mixture of methanol and water, free of methyl acetate, is obtained from the bottom of the tower and fed to tower No. 20.

A split separation of methanol from water is the purpose of tower 20. A methanol of 99.5% assay is obtained in the overhead and water containing traces of methanol is recovered from the bottom.

The distillate of tower 16 is dehydrated in tower 22, to produce methyl acetate assaying 99.5% ester. The dehydration is achieved by removing the water as a lower boiling azeotrope with n-pentane. By feeding the water containing methyl acetate a third the way down from the top of the tower and introducing n-pentane a third the way up from the bottom, the upward rising n-pentane vapors carry the water overhead as lower-boiling azeotrope. The water coming from the condenser is trapped in the decanter before the liquid n-pentane recirculates to the tower. As a result dehydrated methyl acetate is continuously withdrawn from the tower base.

It is to be understood that it is intended to cover all changes and modifications of the examples of the invention herein chosen for the purpose of illustration which do not constitute departures from the spirit and scope of the invention.

We claim:

1. In separating the components of a solution consisting essentially of methyl acetate and methanol, the process which comprises fractionating the said solution until the content of the acetate in the resulting fractionated mixture rises to at least about 70 parts by weight for 30 parts of the methanol, introducing water continuously into the thus fractionated mixture and causing the water to flow downwardly and countercurrently in intimate contact with the said solution below the position of the introduction of the water, continuing the fractionation during the introduction of the water and at a level above that of the introduction of the water so as to form a binary azeotrope and until the fractionated material contains methyl acetate and water in substantially azeotropic proportions for the said binary azeotrope, withdrawing the said fractionated material as the overhead vapor to a condenser therefor, discontinuing the introduction of water when methanol begins to appear in substantial proportion in the overhead vapor, then fractionating, condensing and collecting separately a fraction comprising methanol and residual methyl acetate until substantially no more methyl acetate appears in the resulting condensate, and then fractionating and collecting as another fraction the remaining methanol in the still, the proportion of total water introduced being approximately within the range 100–600 parts by weight for 100 parts of methanol in the said fractionated mixture at the position of introduction of the water.

2. The process of claim 1, the said solution consisting essentially of approximately 30–81 parts by weight of methanol for 100 parts total of methanol and methyl acetate.

References Cited in the file of this patent

UNITED STATES PATENTS

| | | |
|---|---|---|
| 2,155,625 | Von Retze | Apr. 25, 1939 |
| 2,671,052 | Mitchell et al. | Mar. 2, 1954 |
| 2,751,337 | Goddin et al. | June 19, 1956 |
| 2,865,955 | Ascherl et al. | Dec. 23, 1958 |